United States Patent [19]
Kobayashi et al.

[11] 3,843,892
[45] Oct. 22, 1974

[54] OPERATION INDICATING DEVICE FOR HYDRAULIC BRAKE SYSTEM

[75] Inventors: Ikuya Kobayashi; Motoi Noba, both of Toyota; Hiroaki Fujimoto, Osaka, all of Japan

[73] Assignee: Toyota Jidosha Kogyo Kabushiki Kaisha, Toyota-shi, Japan

[22] Filed: Dec. 19, 1973

[21] Appl. No.: 426,121

[30] Foreign Application Priority Data
Dec. 27, 1972   Japan.............................. 47-3318

[52] U.S. Cl............ 307/10 R, 340/52 C, 317/155.5, 335/179
[51] Int. Cl................................................ B60t 17/22
[58] Field of Search.......... 307/10 R; 340/52 C, 53; 180/103; 188/1 A, 151 A

[56] References Cited
UNITED STATES PATENTS
| | | | |
|---|---|---|---|
| 3,439,322 | 4/1969 | Gardner........................ | 340/52 C |
| 3,560,918 | 2/1971 | Lewis et al..................... | 340/52 C |
| 3,772,642 | 11/1973 | Schlorke........................ | 307/10 R |
| 3,808,449 | 4/1974 | Peruglia........................ | 307/10 R |

*Primary Examiner*—L. T. Hix
*Attorney, Agent, or Firm*—Stevens, Davis, Miller & Mosher

[57] ABSTRACT

An indicating device for warning an operator of trouble in a hydraulic brake system of a vehicle. The indicating device comprises a pilot lamp located at a convenient place, a contact device for selectively connecting an electric source to the lamp through a key switch of the vehicle, a pressure switch to be actuated in response to line pressure of a predetermined value yielded within the hydraulic brake system, an open-type brake switch to be closed in response to stepping on a brake pedal of the vehicle after the pressure switch is actuated, and a bistable electromagnetic relay to actuate the contact device. The contact device includes a first and a second fixed contacts permanently magnetized, the first contact being insulated and the second contact being connected to the pilot lamp, and a magnetizable mobile contact to be engaged with the second contact for selectively connecting the electric source to the pilot lamp. The electromagnetic relay includes a first coil connected at its one end to the electric source across the brake switch and grounded at its other end across the pressure switch and a second coil connected in parallel with the first coil and the pressure switch, the first coil being wound in an opposite direction against the second coil around said mobile contact of the contact device and exerting larger electromagnetic force than that of the second coil.

5 Claims, 4 Drawing Figures

Fig.1
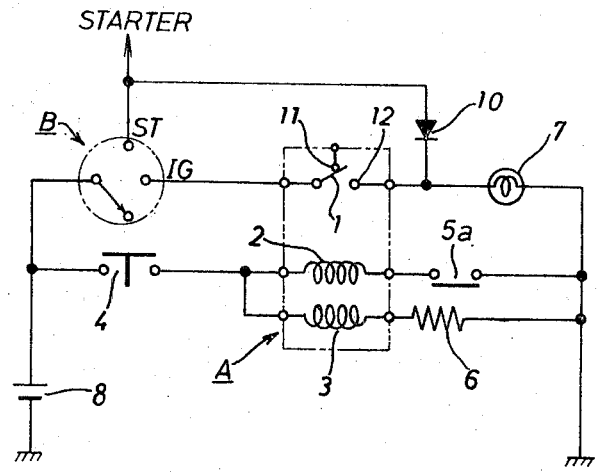
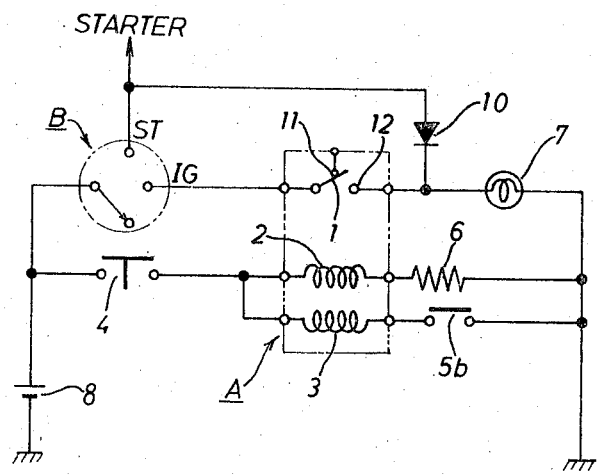
Fig.2

OPERATION INDICATING DEVICE FOR HYDRAULIC BRAKE SYSTEM

BACKGROUND OF THE INVENTION

The present invention relates to an operation indicating device for a hydraulic brake system of a vehicle, and more particularly to an indicating device for warning a vehicle operator of trouble in the hydraulic brake system.

SUMMARY OF THE INVENTION

The main object of the present invention is to provide an indicating device to warn a vehicle operator of trouble in a hydraulic brake system by lighting a pilot lamp located at a convenient place of the vehicle when the line pressure of fluid circuits of the brake system does not rise up to a predetermined value while a depressing actuation is given to a service brake pedal.

Another object of the present invention is to provide an indicating device, having the above-mentioned characteristics, wherein the pilot lamp remains lighted by way of a bistable electromagnetic relay provided therein upon closing an ignition key switch until the problem is removed and is turned off by the depressing actuation given to the brake pedal after removal of the problem.

A further object of the present invention is to provide an indicating device, having the above-mentioned characteristics, wherein the device is made compact with a low production cost and can be adapted to various conventional types of hydraulic brake system.

According to the present invention, there is provided with a device for indicating troubles within an automobile hydraulic brake system, which comprises an electric source; a pilot lamp located at an instrument panel of the vehicle; contact means including a first and a second fixed contacts permanently magnetized, the first contact being insulated and the second contact being connected with the lamp, and a magnetizable mobile contact to be engaged with the second contact for selectively connecting the electric source to the lamp through an ignition key switch of the vehicle. The indicating device further comprises a hydraulic pressure switch disposed within the braking circuits of the brake system to be actuated in response to a pressure value at or over a predetermined one within the braking circuits; a normally open-type brake switch to be closed in response to a depressing actuation on a brake pedal of the vehicle after the pressure switch is activated; and a bistable electromagnetic relay including a first coil connected at its one end to the electric source across the brake switch and grounded at its other end across the pressure switch, and a second coil connected in parallel with the first coil and the pressure switch, the first coil being wound in an opposite direction against the second coil around the mobile contact of the contact means and exerting larger electromagnetic force than that of the second coil.

In the event of line pressure failure, or when no hydraulic pressure of a given value is produced within the braking circuits in accordance with the brake pedal depression of a certain distance, the mobile contact of the contact means is engaged with the second fixed contact by means of the electromagnetic force exerted from both or one of the relay coils energized upon the closure of the brake switch with the pressure switch remaining extraordinarily deactivated so as to light the pilot lamp and maintains the engagement with the second contact by the permanent magnetic force of the second contact to let the pilot lamp remain lighted.

When the trouble within the hydraulic brake system is removed, the increase of the hydraulic pressure up to the predetermined value within the braking circuits is detected by the pressure switch and the mobile contact is engaged with the first contact by means of the electromagnetic force exerted from the relay coils to consequently deactivate the pilot lamp.

BRIEF DESCRIPTION OF THE DRAWINGS

The above and other objects, features and advantages of the present invention will become more readily apparent from the following description of the preferred embodiments with reference to the accompanying drawings forming a part of the specification.

In the drawings:

FIG. 1 is a schematic diagram showing the circuit of an operation indicating device for a hydraulic brake system in accordance with the present invention;

FIG. 2 is a schematic diagram showing a modification of the circuit of FIG. 1;

DESCRIPTION OF THE PREFERRED EMBODIMENTS

Figure 3:
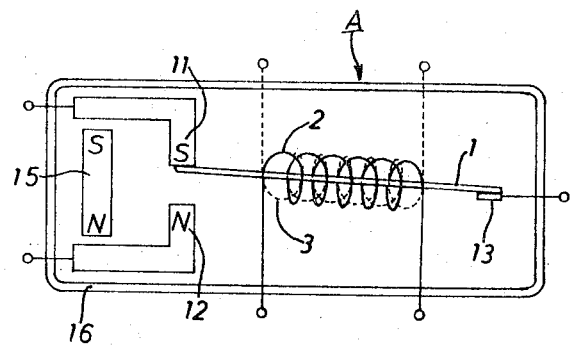
FIG. 3 depicts schematically an assembling construction of the electromagnetic relay shown in FIG. 1.

Now referring to FIG. 1 of the accompanying drawings, there is shown a bistable electromagnetic relay A which comprises a first and a second coils 2 and 3, a first and a second fixed contacts 11 and 12, and a mobile contact 1. The mobile contact 1 is formed by a magnetizable member and is connected to an ignition terminal IG of a key switch B connected with an electric source or battery 8 of a vehicle. The first and second fixed contacts 11 and 12 are permanently magnetized, and the former is insulated and the latter is connected with a pilot lamp 7 which is located at an instrument panel of the vehicle and grounded. The wiring connected between the pilot lamp 7 and the second contact 12 is bypassed from a starter terminal ST of the key switch B by way of a diode 10.

A normally closed-type pressure switch 5a is connected at its one terminal with the first coil 2 of the relay A and grounded at its other terminal. This pressure switch 5a is disposed within a braking circuits connecting a master cylinder (not shown) and wheel cylinders of the vehicle (not shown) and will be opened by hydraulic pressure produced within the braking circuits at or over a predetermined value, for instance, 5 kg/cm$^2$. A normally open-type brake switch 4 is connected at its one terminal with the first and second coils 2 and 3 of the electromagnetic relay A and also connected to the battery 8 at its other terminal. This brake switch 4 is closed in response to a depression of a brake pedal of the vehicle after the completion of the normal operation of the pressure switch 5a. The second coil 3 is grounded by way of a resistor 6 connected in series therewith.

To summing-up, it should now be clear that the battery 8, the brake switch 4, the first coil 2 and the pressure switch 5a are aligned in series and also that the battery 8, the brake switch 4, the second coil 3 and the resistor 6 are aligned in series.

Figure 4:
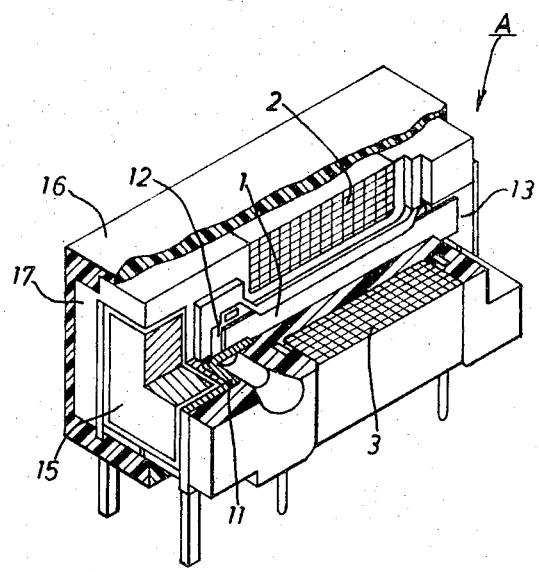
FIG. 4 is a perspective view showing a part cross-section of the mechanical construction of the electromagnetic relay shown in FIG. 1.

Reference is made to FIGS. 3 and 4 for the detailed assembling construction of the bistable electromagnetic relay A. A casing 16 contains therein a holding member 17 which holds all the component parts in their positions. The first and second coils 2 and 3 are oppositely wound on a bobbin portion of the holding member 17 shown in FIG. 4. In FIG. 3, the first and second coils 2 and 3 are illustrated respectively with a solid line and a broken line. The mobile contact 1 is formed by a electromagnetizable metal sheet which is pivoted on a base member 13. This mobile contact 1 extends through the inside of the oppositely wound coils 2 and 3 so that the free end thereof is positioned between the first and second fixed contacts 11 and 12. These fixed contacts 11 and 12 are formed by a pair of crank shaped magnetizable elements and include a permanent magnet 15 therebetween. The contact points of the fixed contacts 11 and 12 are magnetized by the permanent magnet 15 respectively to be a positive pole S and a negative pole N.

Thus, when either of the first or the second coil 2 or 3 is energized, the mobile contact 1 is engaged selectively with the first or the second fixed contact 11 or 12. This engagement will be maintained by the permanent magnetic force of the first or the second fixed contact 11 or 12.

Described hereinafter is the operation of the above-explained circuit. When the key switch B is turned on to the starter terminal ST across the ignition terminal IG, the pilot lamp 7 is turned on by electric current supplied thereon from the battery 8 through the terminal ST and the diode 10. This is to check if the lamp 7 is in an operative condition. When the lamp 7 is not activated while the key switch B is switched to the terminal ST, the lamp 7 needs replacement for a new one.

While the ignition terminal IG of the key switch B is connected to the battery 8, a depression of the brake pedal produces hydraulic pressure of the predetermined value within the braking circuits and the pressure switch 5a is opened prior to the closure of the brake switch 4. The closure of the brake switch 4 energizes only the second coil 3. Consequently, the free end of the mobile contact 1 is attracted and held on the first fixed contact 11 with its free end and base end magnetized respectively to be negative and positive. The lamp 7 is not activated to confirm that normal braking pressure exists within the braking circuits.

When a depression of the brake pedal fails in producing the necessary hydraulic pressure within the braking circuits by such a cause as oil leakage or the like, the pressure switch 5a is not opened and the brake switch 4 is closed with the pressure switch 5a remaining extraordinarily closed to energize both of the first and second coils 2 and 3. The electromagnetic force of the second coil 3 is much less due to the resistor 6 than that of the first coil 2 and the mobile contact 1 is affected only by the electromagnetic force of the first coil 2. Thus, the free end and the base end of the mobile contact 1 are magnetized respectively to be positive and negative, thereby the free end is attracted to the second fixed contact 12. This causes the activation of the lamp 7 so as to warn a vehicle operator of trouble of the brake system.

The mobile contact 1 is kept engaged with the second fixed contact 12 by the permanent magnetic force from the permanent magnet 15 after the brake switch 4 is opened or the key switch B is turned off. Thus, whenever the switch B is switched to its ignition terminal IG, the lamp 7 is always turned on.

Then, a depression of the brake pedal after the necessary repair of the hydraulic brake system will open the pressure switch 5a prior to the closure of the brake switch 4. Consequently, through the above-described process, the mobile contact 1 engages with the first fixed contact 11 to deactivate the lamp 7.

The resistor 6 in the mentioned embodiment may be eliminated when the number of the windings of the second coil 3 is determined properly less than that of the first coil 2.

In reference with FIG. 2, a modification of the above embodiment is disclosed, wherein a normally open-type pressure switch 5b replaces the closed-type pressure switch 5a under such conditions that the resistor 6 is connected to the first coil 2 and the pressure switch 5b is connected to the second coil 3. The check of the lamp 7 is conducted in the same procedure as in the above embodiment.

While the ignition terminal IG of the key switch B is connected to the battery 8, a depression of the brake pedal produces hydraulic pressure of the predetermined value within the braking circuits and the pressure switch 5b is closed prior to the closure of the brake switch 4. The closure of the brake switch 4 energizes both of the first and second coils 2 and 3. The electromagnetic force of the second coil 3 is much more due to the resistor 6 than that of the first coil 2 and the mobile contact 1 is affected only by electromagnetic force of the second coil 3. Consequently, the free end of the mobile contact 1 is attracted and held on the first fixed contact 11 with its free end and base end magnetized respectively to be negative and positive. The lamp 7 is not activated to confirm that normal braking pressure exists within the braking circuits.

When a depression of the brake pedal fails in producing the necessary hydraulic pressure within the braking circuits by such a cause as oil leakage or the like, the pressure switch 5b is not closed and the brake switch 4 is closed. The closure of the brake switch 4 energizes only the first coil 2.

Thus, the free end and the base end of the mobile contact 1 are magnetized respectively to be positive and negative, thereby the free end is attracted to the second fixed contact 12 to activate the lamp 7.

Then, a depression of the brake pedal after the necessary repair of the hydraulic brake system will close the pressure switch 5b prior to the closure of the brake switch 4 so as to engage the mobile contact 1 with the first fixed contact 11 to deactivate the lamp 7.

The lamp 7 may be replaced with a buzzer or both of the lamp and the buzzer can be applied at a time as the warning.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A device for indicating troubles within an automobile hydraulic brake system having a master cylinder, wheel brake cylinders and hydraulic braking circuits to connect said master cylinder with said wheel brake cylinders, comprising:

an electric source;

a key switch;

a pilot lamp located at a convenient place;

contact means including a first and a second fixed contacts permanently magnetized, said first contact being insulated and said second contact being connected with said lamp, and a magnetizable mobile contact to be engaged with said second contact for selectively connecting said electric source to said lamp through said key switch;

pressure switch means disposed within said braking circuits to be actuated in response to a pressure value at or over a predetermined one within said braking circuits;

brake switch means normally opened and operable with a brake pedal on which stepping causes closure of said brake switch means, said closure being conducted after the actuation of said pressure switch means in normal operation thereof when pressure of said predetermined value is produced within said braking circuits; and electromagnetic relay means including a first coil connected at its one end to said electric source across said brake switch means and grounded at its other end across said pressure switch means, and a second coil connected in parallel with said first coil and said pressure switch means, said first coil being wound in an opposite direction against said second coil around said mobile contact and producing larger electromagnetic force than that of said second coil, whereby said mobile contact is engaged with said second fixed contact by means of the electromagnetic force exerted from both or one of said coils energized upon the closure of said brake switch means with said pressure switch means remaining extraordinarily inoperative to light said pilot lamp and maintains the engagement with said second contact by the permanent magnetic force of said second contact itself so as to let said pilot lamp remain lighted.

2. An indicating device as claimed in claim 1, wherein said first and second fixed contacts are formed by the opposite ends of two magnetizable elements located at the both poles of a permanent magnet assembled within a casing and said mobile contact is a magnetizable member pivoted at its one end and at its other end positioned between said two elements within said casing.

3. An indicating device as claimed in claim 1, wherein a resistor is connected in series with said second coil of said relay means to make the electromagnetic force of said second coil less than that of said first coil.

4. An indicating device as claimed in claim 1, wherein said pressure switch means is a normally closed pressure switch to be opened in response to the pressure of said predetermined value, whereby said mobile contact of said contact means is engaged with said second fixed contact by means of the electromagnetic force exerted from both of said coils energized upon the closure of said brake switch means with said pressure switch remaining extraordinarily closed to light said pilot lamp.

5. An indicating device as claimed in claim 1, wherein said pressure switch means is a normally open pressure switch to be closed in response to the pressure of said predetermined value, whereby said mobile contact of said contact means is engaged with said second fixed contact by means of the electromagnetic force exerted from said second coil energized upon the closure of said brake switch means with said pressure switch remaining extraordinarily opened to light said pilot lamp.

* * * * *